Feb. 12, 1952 C. W. HANSELL ET AL 2,585,243
PLURAL WAVE GUIDING SYSTEM
Filed Oct. 2, 1948
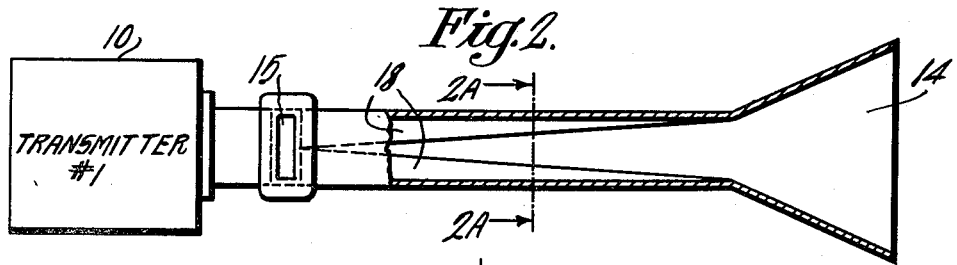
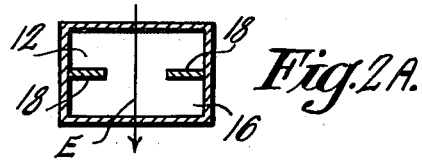
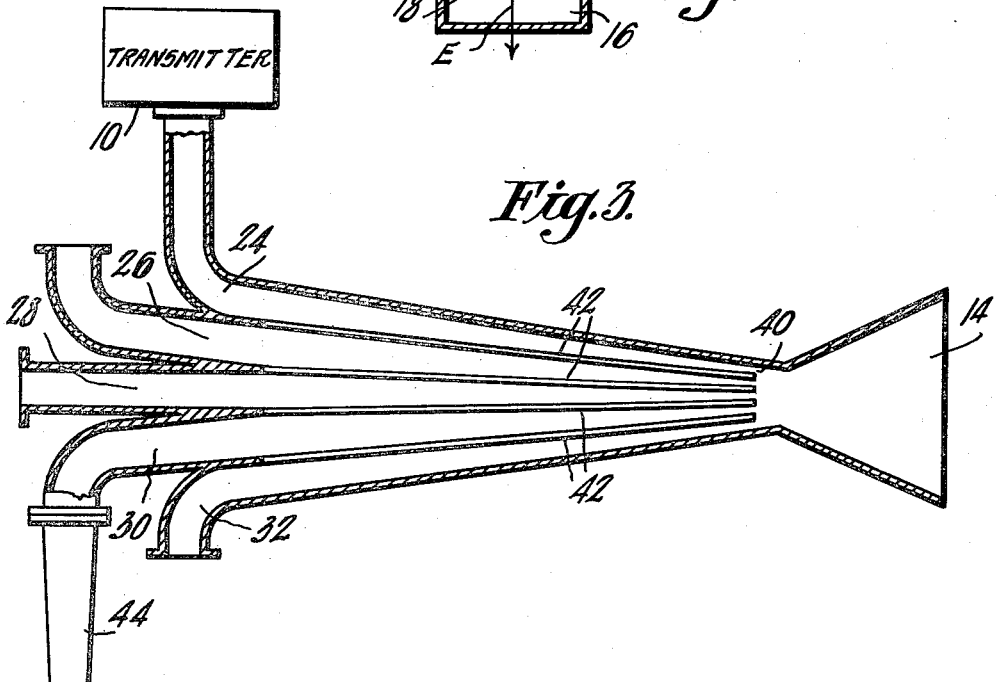
INVENTORS
CLARENCE W. HANSELL
& NILS E. LINDENBLAD
BY
ATTORNEY Patented Feb. 12, 1952

2,585,243

UNITED STATES PATENT OFFICE 2,585,243

PLURAL WAVE GUIDING SYSTEM

Clarence W. Hansell and Nils E. Lindenblad, Port Jefferson, N. Y., assignors to Radio Corporation of America, a corporation of Delaware Application October 2, 1948, Serial No. 52,454

13 Claims. (Cl. 250—33.63)

The present invention relates to transmission lines and wave guides and more particularly to high frequency energy transmitting and guiding systems which are arranged to feed a single load from a plurality of uncoupled sources of high frequency energy.

An object of the present invention is to provide means to couple a plurality of individual transmitters to a single antenna without interaction between the several transmitters.

Another object of the present invention is to provide means to couple a plurality of sources of high frequency energy to a single load without interaction between the sources.

A further object of the present invention is to provide a wave guide system in which a plurality of separate wave guides are gradually coupled together into a single terminal wave guide.

Still another object of the invention is to provide a wave guide system realizing the features of a hybrid circuit.

The foregoing objects and others which may appear from the detailed description are attained according to the invention by providing a number of rectangular wave guides running generally parallel to each other and being in contact along their adjacent surfaces for a portion of their length and gradually coupled together by providing an ever-widening slot in the common wall between the two guides. Thus separate transmitters energizing each wave guide supply a common load circuit without interaction between the transmitters. The coupling from one transmitter to another may be made extremely small if there is no reflection from the load circuit back toward the transmitters. Any reflected waves from the antenna or load circuit are divided equally between the several wave guides so that the reflected power returning to each transmitter along each path is inversely proportional to the number of guides. Thus, for two transmitters one half of the reflected energy is returned to each transmitter. Ordinarily the transmitter from which the energy reflected did not originate is tuned so far remote from the reflected wave that most of the reflected energy arriving thereat will be again reflected back to the antenna. If the system includes more than a pair of transmitters, say for example, eight transmitters coupled by eight wave guides merging into a single antenna wave guide, then, of course, only one-eighth of the reflected wave power returns to each transmitter.

As a consequence of this feature of the present invention, it may be desirable even when operating only a single transmitter to utilize a merging wave guide system between the transmitter and its load so that only a fraction of the reflected power returns to the transmitter to affect its output impedance and frequency resistance.

The present invention will be described with reference to the accompanying drawing forming a part of the specification and in which:

Figure 1 illustrates in side sectional view an embodiment of the present invention, while Figure 2 illustrates the top view of the embodiment of Figure 1;

Figure 2a illustrates a transverse cross section looking in the direction a, a of Figure 2; while Figure 3 illustrates a further modification of the present invention.

Referring now to Figure 1 there is shown a first transmitter 10 coupled to a wave guide 12 which in turn is coupled to a horn radiator 14. Running parallel to wave guide 12 and in contact therewith is a second wave guide 16 also coupled to radiator 14. End 15 of guide 16 is adapted to be coupled to a second transmitter (not shown). The walls of the wave guides 12 and 16 are in contact over a suitable distance, say 30 to 50 wavelengths. The partition between the wave guides 12 and 16 is provided with a long tapered slot 18, which slot 18, is shown in greater detail in Figure 2. The slot 18 provides a gradually increasing coupling between wave guides 12 and 16 in the direction of travel from the transmitters toward antenna 14. Wave guides 12 and 16 are so energized that there are no cross currents in slot 18. In other words, the slot is located symmetrically around the bisector of the electric field, the vector of which field is shown at E in Figure 2a. Thus, the merger coupling is electrical. Magnetic coupling, that is, with the polarization in quadrature to the manner described, may of course be used if desired; but in this case means must be provided whereby the current existing in the merging region can be bridged or shunted.

With the above-described arrangement wherein the horn antenna matches the impedance of wave guide arrangement 12 and 16 fairly closely, it is found that the coupling between the wave guides at their entrance ends is down at least 50 db. In a test of the arrangement shown, it was found that backing up of energy from transmitter 10 into the idle wave guide took place only when a large reflecting sheet was held at certain critical distances in front of the horn 14. Otherwise, when the operation of horn 14 was unimpeded, substantially no energy from transmitter 10 could be detected in throat 15. Coupling between two sources connected to the merging system takes place only in proportion to the amount of reflection back along the wave guides.

Experiments with wave guide systems according to the present invention indicate that half of the power retains the normal mode while the other half shifts into a push-push mode after merging. When the load circuit is constituted by an antenna matching both modes, no reflection takes place and half of the power is radiated in the desired pattern whereas the remaining power is radiated in a bilobular pattern symmetrically split on the axis of the horn radiator. Thus, the half-power radiation in the normal forward direction of the antenna may be utilized to transmit a useful signal and the remaining energy spent in the bilobular pattern corresponds to energy dissipated in the auxiliary sink of a hybrid circuit. Thus, an equivalent hybride circuit is realized in a wave guide system which also obviates the difficulty in constructing a sink capable of absorbing a large amount of power since the useless power is radiated into surrounding space.

In the arrangement shown in Figures 1 and 2, the strongest field of the useful signal of each of the transmitters will be radiated in somewhat different directions since the radiation patterns of one of the signals will add to one side of the axis of symmetry and subtract on the other, whereas the inverse will take place with respect to the other of the signals due to the phase relationships of the signals as they merge in the merger section of the wave guide system.

Now, while the present invention may be expanded to take care of more than two transmitters by further branching each of the wave guides 12 and 16 in turn in an indefinite number of times in succession, it is believed preferable to merge several abreast as shown in Figure 3. Here several adjacent wave guides 24, 26, 28, 30 and 32 are formed by the multiple partitioning of a single large tapering wave guide 40 and by providing each partition with gradually widening slots 42, which slots are similar to slot 18 of Figures 1 and 2. Obviously a number of wave guides of rectangular formation could be combined as taught by the structure of Figures 1 and 2, but they would tend to produce a stack of impractical dimensions at the output end. Therefore, the stack is preferably tapered down along the length of the run of the merging portion so that the final width at the output end where the individual slots 42 reach the full width of the guide is equal to that of a single guide.

Since it is most practical to merge guides of the same size, but since the freqeuncy may differ greatly in the different channels, it is considered desirable to taper some of the individual guides before joining the combination system. An illustrative tapered wave guide section 44 is connected between transmitter 46 and merging guide 30. Transmitter 46 may be of such high frequency that it would be desirable to use a wave guide having smaller dimensions than the wave guide used for the remainder of the system. Thus, uncertain modes which may result from transmitting a high frequency in a large guide may be avoided. The tapered section 44 serves to transform the optimum dimensions of wave guide for transmitter 46 to a uniform size of wave guide for the merger section.

If desired the output of a plurality of multiple wave guide systems such as shown in Figure 3 may be further joined in polarization quadrature as disclosed in U. S. Patent 2,364,371, granted December 5, 1944, to Martin Katzin.

While the invention has been described in terms of several express embodiments, it is to be understood that numerous modifications will be suggested to those skilled in the art without departing from the spirit and the scope of the invention.

We claim:

1. A wave guide system for coupling energy sources of different frequency to a common load without interaction between said sources, including a wave guide section adapted to be connected at one end to said common load and to be connected at the other end to branch wave guides connected to said energy sources, said wave guide section having a wall member arranged therein, said wall member being contiguous to said branch wave guides connected at said other end and having a triangular slot therein, the apex of said slot being located substantially at the connection to said branch wave guides and the base of said triangular slot being located substantially at said one end of said wave guide section.

2. A wave guide system for coupling two energy sources of different frequency to a common load without interaction between said sources, including a wave guide section adapted to be connected at one end to said common load and having a wall member bifurcating said wave guide section at the other end to form branch wave guides adapted to be connected to said energy sources, said wall member having a triangular slot therein, the apex of said slot being located substantially at the connection to said branch wave guides and the base of said triangular slot being located substantially at said one end of said wave guide section.

3. A section of hollow pipe wave guide for coupling energy sources of different frequency to a common load without interaction between said sources, comprising a hollow pipe structure adapted to be connected at one end to said common load, said hollow pipe structure having boundary surface members arranged therein, said boundary surface members being contiguous to opposing internal surfaces of said hollow pipe structure, and having right triangular configurations forming an ever widening slot therein, the base of said slot being located substantially at said one end of said hollow pipe structure and the apex of said triangular slot being located substantially at the other end of said hollow pipe structure, and means to couple said energy sources to said other end of said hollow pipe structure.

4. A section of hollow pipe wave guide for coupling energy sources of different frequency to a common load without interaction between said sources, comprising a hollow conductive structure adapted to be connected at one end to said common load, said hollow conductive structure having conductive surface members arranged therein, said conductive surface members being contiguous to opposing internal surfaces of said hollow conductive structure, and having right triangular configurations forming an ever widening slot therein, the base of said slot being located substantially at said one end of said hollow conductive structure and the apex of said triangular slot being located substantially at the other end of said hollow conductive structure, and means to couple said energy sources to said other end of said hollow conductive structure.

5. A wave guide structure for directing energy waves of different frequency to a common load device comprising a conductive surface member having a triangular slot therein, a conductive surface element arranged on one side of said conductive surface member to constitute a wave guide section about said triangular slot, and a conducting surface element arranged on the other side of said conductive surface member to constitute another wave guide section, each of said elements terminating at substantially the base and apex of said triangular slot, means to couple said load device to said wave guide sections at the end adjacent the base of said triangular slot, and means to apply said energy waves individually to said wave guide sections adjacent the apex of said triangular slot.

6. A wave guide system for coupling energy sources of different frequency to a common load without interaction between said sources, comprising a wave guide section of rectangular cross-section adapted to be connected at one end to said common load and having a pair of vanes lying in a plane parallel to two sides of said wave guide section, said vanes being of right triangular configuration with the apices thereof located substantially at said one end and the bases thereof being located substantially at the other end, and means to couple said sources to said other end of said wave guide section.

7. A high frequency waveguide system for energizing a common load element from a plurality of energy sources, including a plurality of waveguide sections running in contiguous relationship for a distance at least as great as a plurality of wavelengths at the operating frequency, means to couple an energy source to each of said waveguide sections at one end thereof, and means to couple said load element to all of said waveguide sections at the ends remote from said source coupling means, said waveguide sections having a long continuously widening slot in the contiguous walls thereof.

8. A high frequency waveguide system for energizing a common radiator element from a plurality of energy sources, including a plurality of waveguide sections running in contiguous relationship for a distance at least as great as a plurality of wavelengths at the operating frequency, means to couple an energy source to each of said waveguide sections at one end thereof, and means to couple said radiator element to all of said waveguide sections at the ends remote from said source coupling means, said waveguide sections having a long continuously widening slot in the contiguous walls thereof.

9. A high frequency waveguide system for energizing a common horn radiator element from a plurality of energy sources, including a plurality of waveguide sections running in contiguous relationship for a distance at least as great as a plurality of wavelengths at the operating frequency, means to couple an individual energy source to each of said waveguide sections at one end thereof, and means to couple said horn radiator element to all of said waveguide sections at the ends remote from said source coupling means, said waveguide sections having a long continuously widening slot in the contiguous walls thereof.

10. A high frequency waveguide system for energizing a common load element from a plurality of energy sources, including a plurality of waveguide sections running in contiguous relationship for a distance at least as great as a plurality of wavelengths at the operating frequency, means to couple an energy source to each of said waveguide sections at one end thereof, and means to couple said load element to all of said waveguide sections at the ends remote from said source coupling means, said waveguide sections having a long continuously widening slot in the contiguous walls thereof, said slot providing a coupling between the waveguide sections in contiguous relationship gradually increasing toward said load element.

11. A high frequency waveguide system for energizing a common horn radiator from a plurality of energy sources, including a plurality of waveguide sections running in contiguous relationship for a distance at least as great as a plurality of wavelengths at the operating frequency, means to couple an individual energy source to each of said waveguide sections at one end thereof, and means to couple said horn radiator to all of said waveguide sections at the ends remote from said source coupling means, said waveguide sections having a long continuously widening slot in the contiguous walls thereof, said slot providing a coupling between the waveguide sections in contiguous relationship gradually increasing toward said horn radiator.

12. A high frequency waveguide system for energizing a common load element from a plurality of energy sources, including a plurality of waveguide sections running in contiguous relationship for a distance at least as great as a plurality of wavelengths at the operating frequency, means to couple an energy source to each of said waveguide sections at one end thereof, and means to couple said load element to all of said waveguide sections at the ends remote from said source coupling means, said waveguide sections having the electric fields within the guides lying in the same direction, there being a long continuously widening slot in the contiguous walls of said waveguide sections.

13. A high frequency waveguide system for energizing a common radiator element from a plurality of energy sources, including a plurality of waveguide sections running in contiguous relationship for a distance at least as great as a plurality of wavelengths at the operating frequency, means to couple an energy source to each of said waveguide sections at one end thereof, and means to couple said radiator element to all of said waveguide sections at the ends remote from said source coupling means, said waveguide sections having the electric fields within the guides lying in the same direction, there being a long continuously widening slot in the contiguous walls of said waveguide sections, said slot providing a coupling gradually increasing in the direction of said radiator element.

CLARENCE W. HANSELL.
NILS E. LINDENBLAD.

REFERENCES CITED

The following references are of record in the file of this patent:

UNITED STATES PATENTS

| Number | Name | Date |
| --- | --- | --- |
| 2,153,728 | Southworth | Apr. 11, 1939 |
| 2,255,042 | Barrow | Sept. 9, 1941 |
| 2,423,526 | Sontheimer et al. | July 8, 1947 |
| 2,433,368 | Johnson et al. | Dec. 30, 1947 |
| 2,437,281 | Tawney | Mar. 9, 1948 |

OTHER REFERENCES

Technique of Microwave Measurements, by Montgomery, Dec. 18, 1947, pp. 885 to 887.